United States Patent [19]

Moriya et al.

[11] 4,437,683
[45] Mar. 20, 1984

[54] AUTOMATIC SEATBELT SYSTEM

[75] Inventors: Shigeru Moriya; Akio Yoshida, both of Toyota; Yoshihiro Hayashi, Kasugai; Tatsushi Kubota, Okazaki; Hiroshi Tsuge, Chiryu, all of Japan

[73] Assignees: Toyota Jidosha Kogyo Kabushiki Kaisha; Kabushiki Kaisha Tokai-Rika-Denki-Seisakusho, both of Aichi, Japan

[21] Appl. No.: 300,069

[22] Filed: Sep. 8, 1981

[30] Foreign Application Priority Data

Sep. 9, 1980 [JP] Japan ............................ 55-128214[U]

[51] Int. Cl.³ ............................................ B60R 21/10
[52] U.S. Cl. ...................................... 280/804; 297/469
[58] Field of Search ............... 280/802, 803, 804, 806, 280/808; 297/469

[56] References Cited

U.S. PATENT DOCUMENTS

| 3,995,884 | 12/1976 | Bauer et al. | 280/804 |
| 4,268,068 | 5/1981 | Suzuki et al. | 280/804 |
| 4,274,657 | 6/1981 | Johnson et al. | 280/803 |
| 4,284,294 | 8/1981 | Takada | 280/804 |

FOREIGN PATENT DOCUMENTS

| 55-39827 | 3/1980 | Japan | 280/804 |
| 55-123542 | 9/1980 | Japan | 280/804 |

Primary Examiner—Joseph F. Peters, Jr.
Assistant Examiner—Ross Weaver
Attorney, Agent, or Firm—Parkhurst & Oliff

[57] ABSTRACT

An automatic seatbelt system which has a flexible tape extending continuously along a vehicle body form a roof side portion through a center pillar to a door so as to move a shoulder webbing connected to the roof side portion and a lab webbing connected to the door at the same time by a single driving sprocket wheel in response to an occupant entering or leaving a vehicle. The tape has a plurality of openings along the longitudinal direction thereof and the sprocket wheel is meshed with the tape by the openings. A shoulder guide rail is provided along the roof side portion of the vehicle body, within which a shoulder guide member guiding the shoulder webbing and connected to the trape is slidably received. A lap guide rail is provided along the door, within which a lap guide member guiding the lap webbing and connected to the tape is slidably received. When the sprocket wheel rotates, both shoulder and lap seatbelt webbings are simultaneously moved through the tape toward either the front side of the vehicle to provide an enough space for the occupant to enter the vehicle, or the rear side of the vehicle to place the webbings over the occupant at a seat.

6 Claims, 18 Drawing Figures

FIG.13
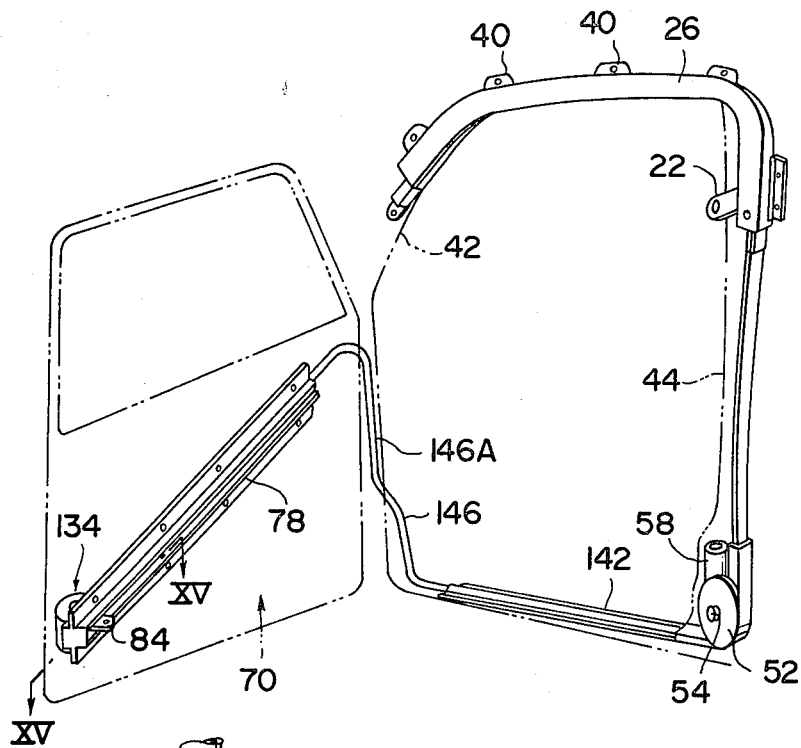
FIG.14
FIG.15
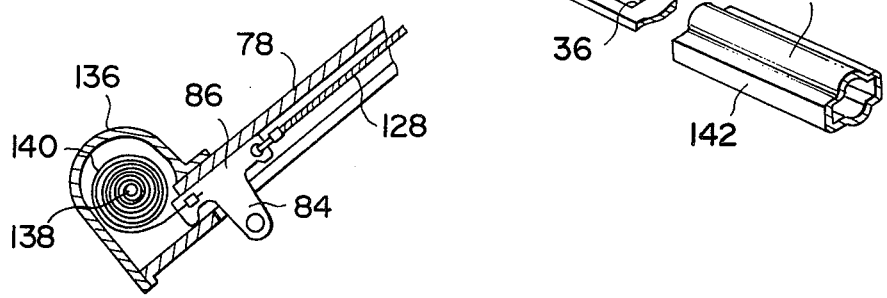

AUTOMATIC SEATBELT SYSTEM

BACKGROUND OF THE INVENTION

1. Field of the Invention

This invention relates to an automatic seatbelt system, and more particularly to an automatically fastening seatbelt system for automatically fastening webbings about an occupant in an emergency of a vehicle.

2. Description of the Prior Art

Heretofore, there has been proposed an automatically fastening seatbelt system for automatically fastening webbings about an occupant upon his seating at a seat such a type that in which a seated state of the occupant is detected, whereby occupant restraining webbings are moved along a vehicle body by a driving force of an electric motor or the like, so that the occupant can be brought into an automatically webbing fastened state. This type of automatically webbing fastening seatbelt system has been highly evaluated because high webbing moving strokes can be obtained without any handling of the occupant.

However, in this conventional automatically fastening seatbelt system, in order to automatically bring the occupant into a three-point fastened state, it has been necessary to provide at least two electric motors per occupant for moving a shoulder webbing and a lap webbing, resulting in raised manufacture costs, increased weight and reduced compartment space. When only one motor has been used in the conventional system, either a shoulder webbing or a lap webbing is moved, thus causing a hindrance to comfortable and smooth webbing fastening action for the occupant due to the other webbing not moved by the motor.

SUMMARY OF THE INVENTION

The present invention has been developed to obviate the above-described disadvantage of the prior art and has as its object the provision of an automatically fastening seatbelt system in which both a shoulder webbing and a lap webbing are driven by a single electric motor, thereby enabling to automatically fasten the webbings about an occupant.

In the automatically fastening seatbelt system according to the present invention, an electric motor is secured to a portion of a chassis of a vehicle such as the lower portion of a center pillar or the inner surface of a door, a sprocket wheel is driven by this motor, driving forces are imported from one end of a flexible tape, the intermediate portion of which is engaged with the sprocket wheel, to a shoulder guide and from the other end of the flexible tape to a lap guide, respectively, whereby both the shoulder webbing and the lap webbing are moved by the motor through the flexible tape, so that the occupant can be automatically brought into a released state or a webbing fastened state.

BRIEF DESCRIPTION OF THE DRAWINGS

FIG. 13 is a perspective view corresponding to FIG. 2, showing a second embodiment of the present invention;

FIG. 14 is a perspective view showing the essential portions in a disassembled state of the second embodiment;

FIG. 15 is a sectional view taken along the line XV—XV in FIG. 13;

DETAILED DESCRIPTION OF THE PREFERRED EMBODIMENT

Figure 1:
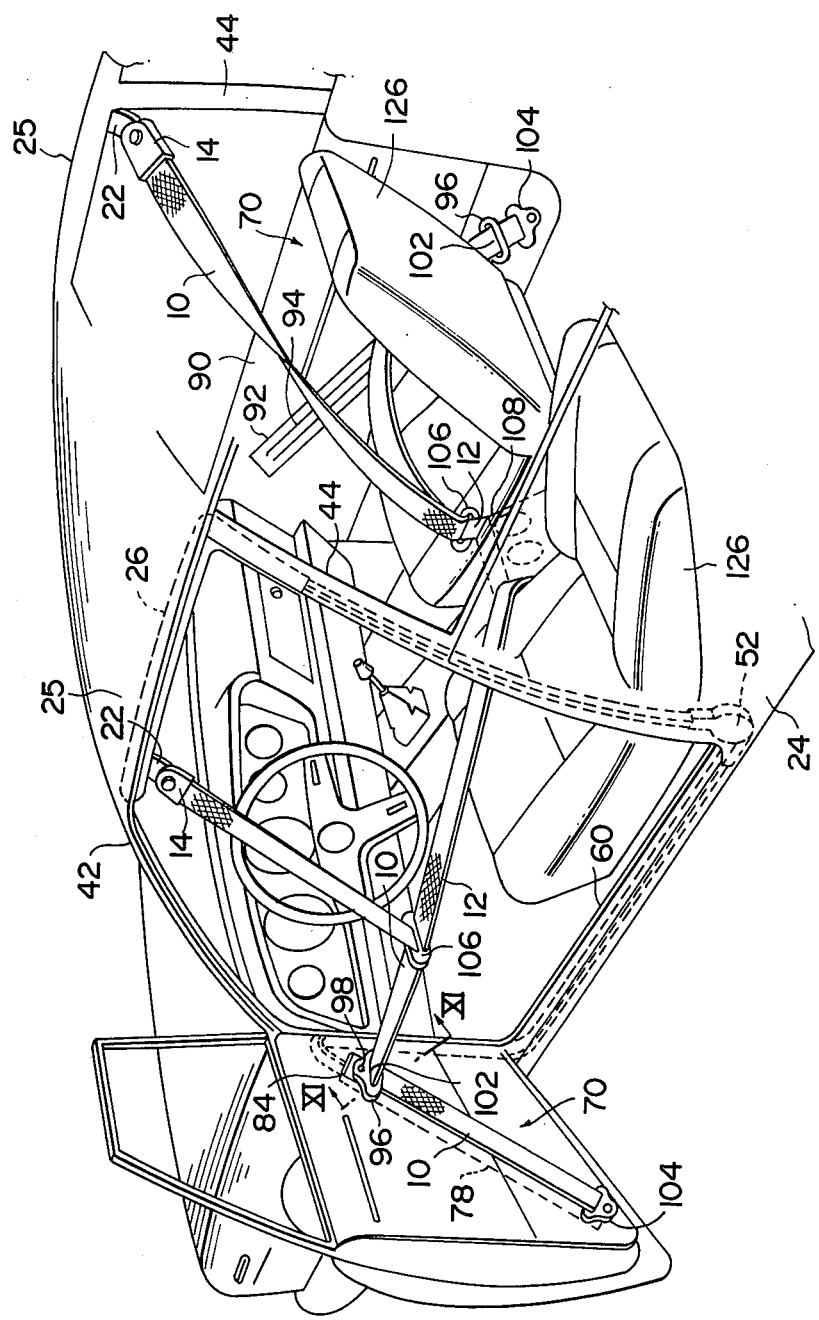
FIG. 1 is a perspective view showing a first embodiment of the automatically fastening seatbelt system according to the present invention.
Figure 2:
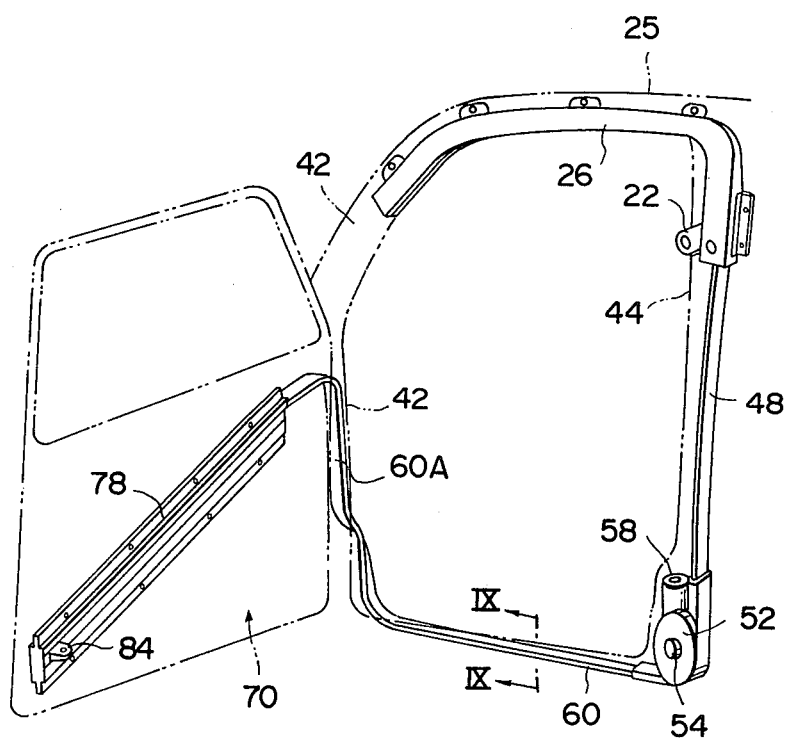
FIG. 2 is a perspective view showing only the essential portions of FIG. 1.

Description will hereunder be given of the embodiments of the present invention. FIGS. 1 and 2 show the first embodiment of the seatbelt system according to the present invention, in which an occupant is automatically brought into a three-point webbing fastened state by use of an outer webbing 10 and an inner webbing 12.

Figure 4:
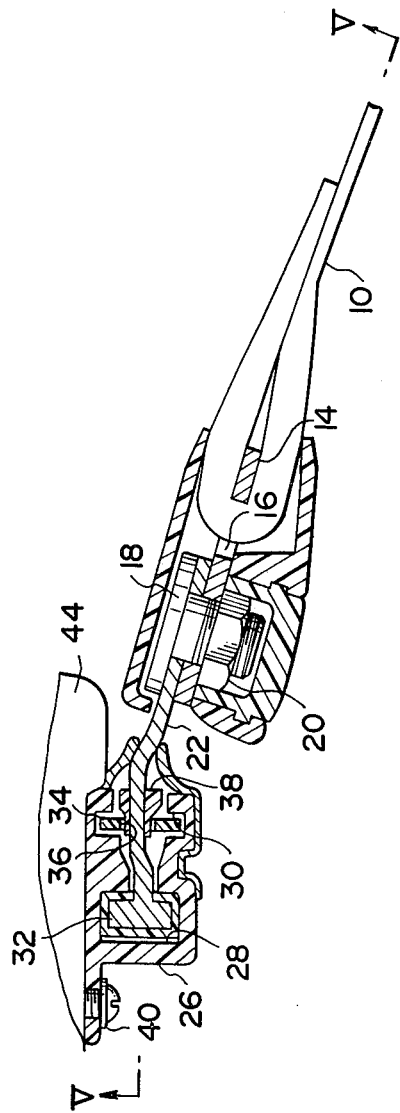
FIG. 4 is a sectional view taken along the line IV—IV in FIG. 3.

As shown in FIG. 4, one end of the outer webbing 10 is turned back at an opening 16 of a shoulder anchor 14, and then, sewn to itself. This shoulder anchor 14 is solidly secured to a shoulder guide member or shoulder guide plate 22 by means of a bolt 18 and a nut 20. It is preferable that this shoulder anchor 14 is rotatable about the bolt 18 only when a webbing tensile force of a high value acts thereon in an emergency of a vehicle.

This shoulder guide plate 22 is adapted to move in the longitudinal direction of the vehicle, being guided by a shoulder guide rail 26 laid along a roof side 25 of the vehicle body in the longitudinal direction of the vehicle.

Figure 6:
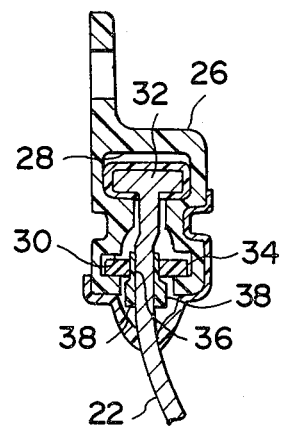
FIG. 6 is a sectional view taken along the line VI—VI in FIG. 3.

Detailed description will now be given of the relationship between this shoulder guide plate 22 and the shoulder guide rail 26. As shown in FIG. 6, the shoulder guide rail 26 has substantially a U-shaped cross section in the longitudinal direction and provided therein with an anchor groove 28 and a slide groove 30, which are substantially in parallel to each other. These anchor groove 28 and slide groove 30 are formed over the entire length of the shoulder guide rail 26 in the longitudinal direction thereof, and an enlarged head 32 of the shoulder guide plate 22 is disposed in the anchor groove 28. This enlarged head 32 is adapted to prevent the shoulder guide plate 22 from falling off the shoulder guide rail 26 in a collision of the vehicle.

Figure 7:
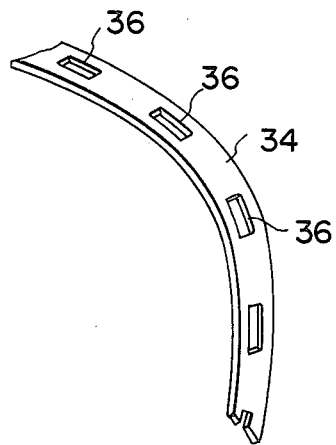
FIG. 7 is a perspective view showing the flexible tape used in this embodiment.

A flexible tape 34 shown in FIG. 7 is received in the slide groove 30 and adapted to slide on the shoulder guide rail 26 in the longitudinal direction thereof. This flexible tape 34 is of a relatively thick wall tape made of a synthetic resin material and capable of imparting both a tensile force and a compressive force in the slide groove 30 in the longitudinal direction thereof.

This tape 34 is penetratingly provided therein with a plurality of rectangular openings 36 at suitable intervals in the longitudinal direction thereof. Extending through one of these rectangular openings 36 is the intermediate portion of the shoulder guide plate 22 which is covered by a bush 38. Consequently, the movement of this flexible tape 34 along the slide groove 30 in the longitudinal direction of the shoulder guide rail 26 causes the shoulder guide plate 22 to move in the longitudinal direction of the guide rail accordingly.

Figure 3:
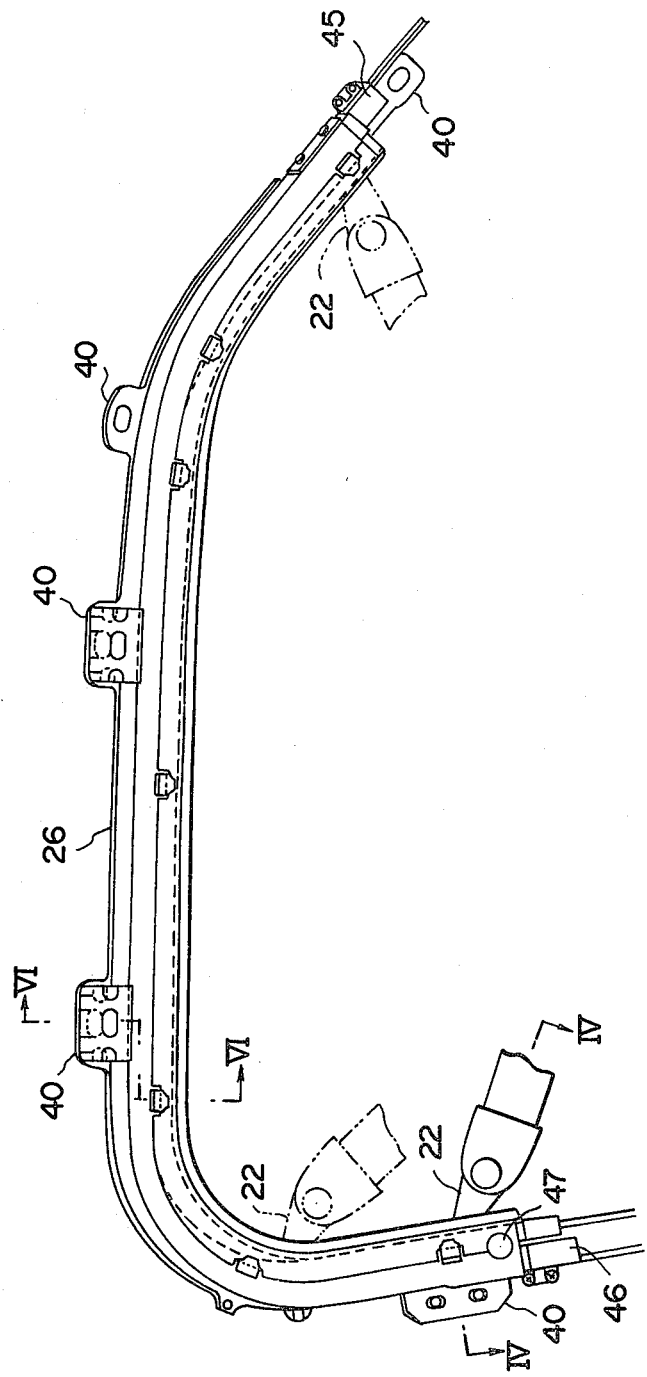
FIG. 3 is a front view showing the shoulder guide rail.

FIG. 3 is an enlarged front view showing the shoulder guide rail, in which the right side of the drawing indicates the front side of the vehicle and the left side thereof indicates the rear side of the vehicle. As shown in FIG. 3, the shoulder guide rail 26 is projectingly provided at suitable portions thereof with mounting brackets 40, through which the shoulder guide rail 26 is solidly secured to the roof side of the vehicle body, the forward end portion thereof (as viewed in the vehicle) descends along a front pillar 42 of the vehicle body as shown in FIG. 2, and the rear end portion thereof is bent substantially perpendicularly to the intermediate portion thereof and descends along a center pillar 44 of the vehicle body. Here, as indicated by solid lines in FIG. 3, when the shoulder guide plate 22 reaches the rear end of the guide rail 26, the position thus reached is an automatically webbing fastening position for the occupant, and, when the shoulder guide plate 22 reaches the forward end, the position thus reached is an automatically webbing unfastening position for the occupant. Limit switches 45 and 46 are provided at the forward and rear ends of the guide rail 26, respectively, and can detect the presence of the shoulder guide plate 22.

Figure 5:
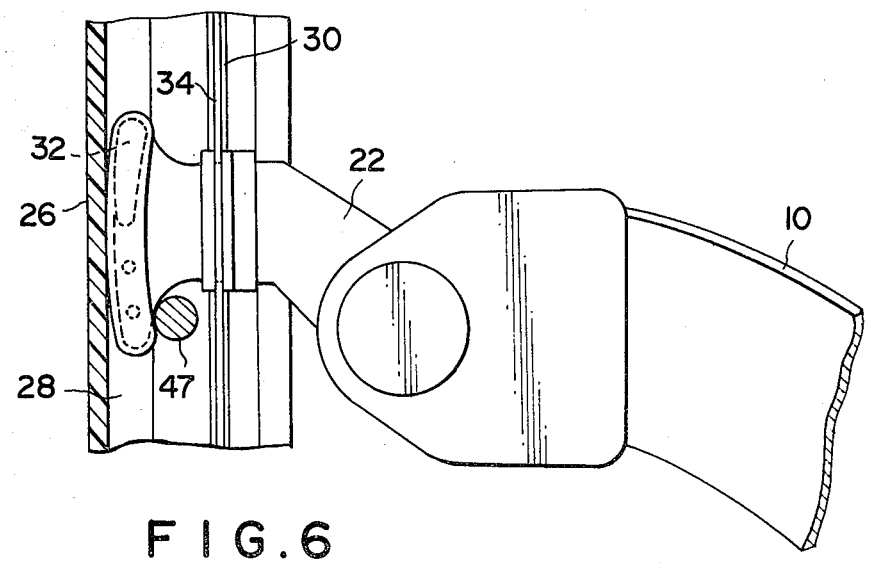
FIG. 5 is a sectional view taken along the line V—V in FIG. 4.

An anchor pin 47 (referring to FIG. 5) is solidly secured to a position adjacent the rear end of the shoulder guide rail 26 and adapted to engage with the enlarged head 32 of the guide plate, which has moved to the rear end portion of the vehicle.

Figure 8:
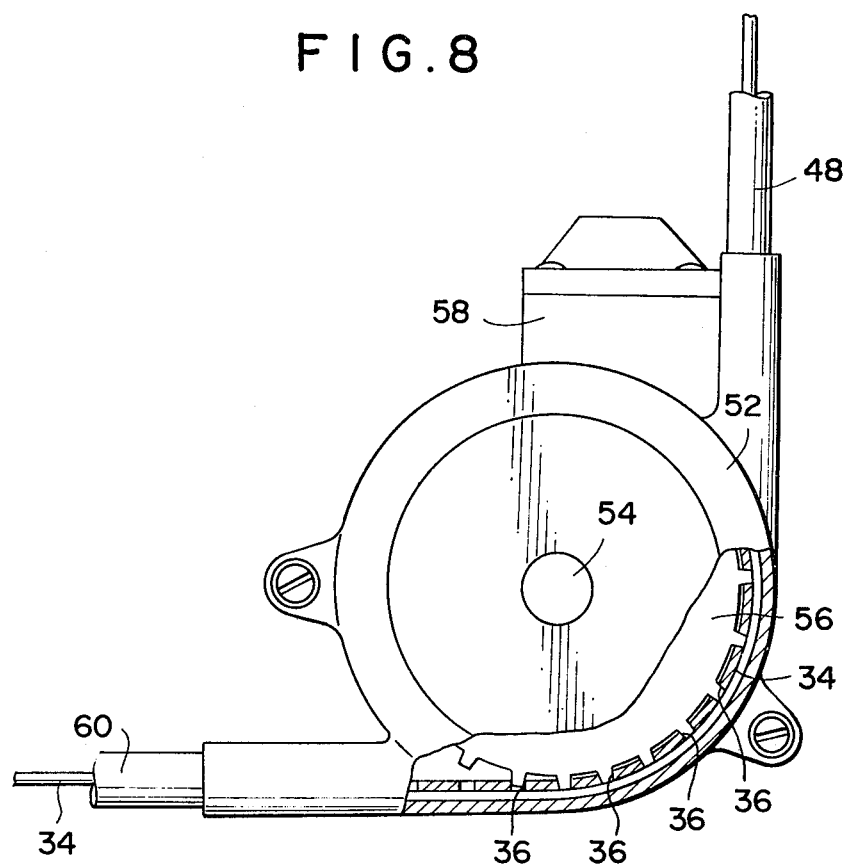
FIG. 8 is a partly broken away view showing the sprocket housing.

As shown in FIG. 2, a track 48 is connected to the rear end portion of the shoulder guide rail 26. This track 48 is provided therein with a guide channel rectangular in cross section slightly larger in cross-sectional area than the flexible tape 34 so as to guide the flexible tape 34 in a sliding condition, and the lower end portion thereof is communicated with a sprocket housing 52 solidly secured to the lower end of the interior of the center pillar 44. As shown in FIG. 8, fixed on a shaft 54 of this sprocket housing 52 is a sprocket wheel 56, which is engaged with the rectangular openings 36 of the flexible tape 34 being introduced through the track 48.

The sprocket wheel 56 is driven by a single electric motor 58 to move the flexible tape 34 in the longitudinal direction thereof. In this embodiment, the motor 58 is adapted to rotate the sprocket wheel 56 in the clockwise direction in FIG. 8 during the occupant entering into the vehicle, or adapted to rotate the sprocket wheel 56 in the counterclockwise direction during the occupant leaving from the vehicle. For example, the motor 58 can be arranged to be actuated by a door switch (not shown) mounted between the door and the vehicle body.

Connected to the sprocket wheel 56 is another track 60 directed in the forward direction of the vehicle. This track 60 is disposed substantially perpendicularly to the track 48, i.e., disposed at the other side of the track 48 through the sprocket housing 52.

Figure 9:
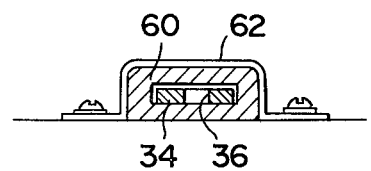
FIG. 9 is a sectional view taken along the line IX—IX in FIG. 2.
Figure 10:
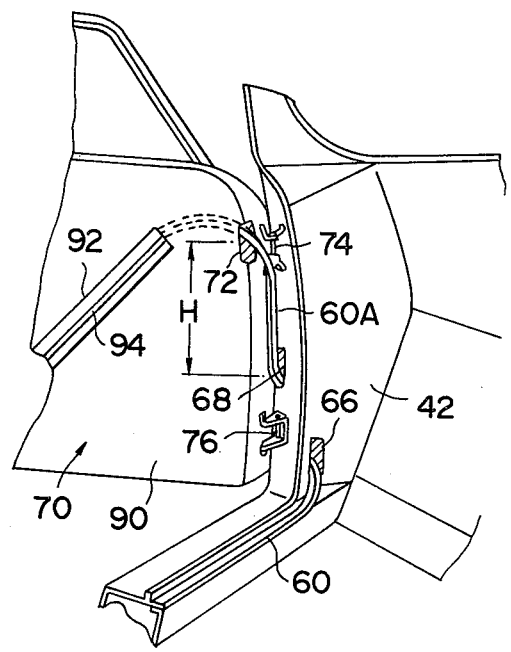
FIG. 10 is a perspective view showing the arrangement of the flexible tape, a door of a truck and a front pillar.

As shown in FIG. 9, this track 60 is secured at a suitable position thereof with brackets 62, through which the track 60 is engaged with the vehicle body. As shown in FIGS. 2 and 10, the intermediate portion of the track 60 is introduced into the front pillar 42 of the vehicle body through an opening 66, thereafter, erected, led out of the front pillar 42 through an opening 68 of the front pillar 42, and led into a door 70 through an opening 72 of the door 70, which is penetrated at a position further upwardly of the opening 68.

Figure 11:
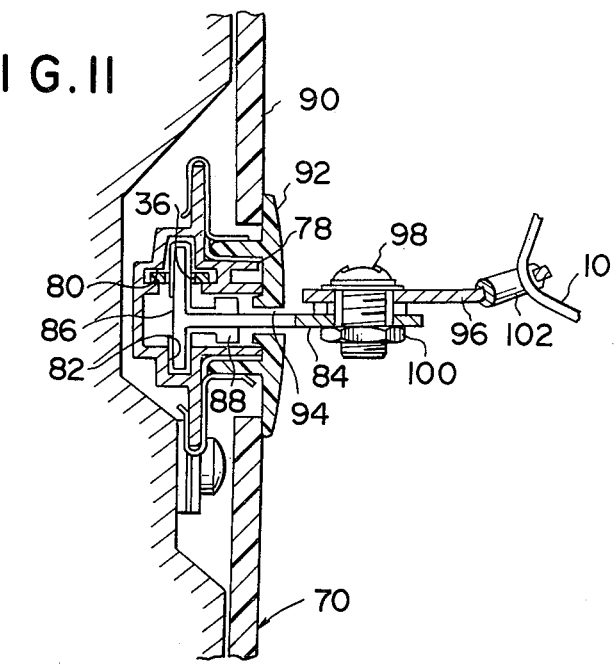
FIG. 11 is a sectional view taken along the line XI—XI in FIG. 1.

Here, a portion of the track 60 between the openings 68 and 72 is disposed between hinges 74 and 76 which rotatably support the door 70 on the front pillar 42, and forms a stepped portion 60A (The difference in height is 'H'). The longitudinal axis of this stepped portion 60A is given with a predetermined curvature so that a suitable deflection can be allowed between the openings 68 and 72 when the door is closed. In consequence, the stepped portion 60A absorbs a change in interval between the door 70 and the front pillar 42 during opening or closing of the door by varying the carvature thereof. Furthermore, the longitudinal axis of the intermediate portion of this stepped portion 60A is aligned with the rotary center of the door hinges 74 and 76, whereby, during opening or closing of the door, the stepped portion 60A may be twisted about the longitudinal axis thereof, thereby enabling to absorb the change in interval between the door 70 and the front pillar 42. In either case, the flexible tape 34 in the track 60 can smoothly travel. The track 60 introduced into the door 70, as shown in FIG. 2, is connected to the forward end portion (as viewed in the vehicle) of a lap guide rail 78 solidly secured to the door. As shown in FIG. 11, this lap guide rail 78 is provided therein over the entire length thereof with a slide groove 80, in which slides the flexible tape 34 guided by the track 60. This lap guide rail 78 is also provided therein over the entire length thereof with a slide groove 82 perpendicularly intersecting the slide groove 80 and the slide groove 82 receives therein an enlarged head 86 of a lap guide member or lap guide plate 84. A portion of the enlarged head 86 is inserted through one of the rectangular opening 36 of the flexible tape 34, so as to move together with the flexible tape 34 along the lap guide rail 78.

This lap guide plate 84 is secured at the intermediate portion thereof with a shoe 88 which slides on the lap guide rail 78, and the forward end portion of the lap guide plate 84 projects to the inside of the vehicle through an opening 94 of a garnish 92 secured to a door trim 90.

A ring plate 96 is rotatably mounted on this lap guide plate 84 by means of a bolt 98 and a nut 100. The intermediate portion of the outer webbing 10 extends through a slot 102 of the ring plate 96, and the other end of the outer webbing 10, as shown in FIG. 1, is solidly secured to the lower rear portion of the door 70 through a lap anchor 104.

As shown in FIG. 2, the lap guide rail 78 is disposed from the lower rear portion to the upper forward portion of the door 70 in a straight-line arrangement or a curved-line arrangement with a suitable curvature, and when the lap guide plate 84 is moved forward in the vehicle by the longitudinal movement of the flexible tape 34, a portion of the outer webbing 10 between the ring plate 96 and the lap anchor 104 is brought into substantially close contact with the inner surface (as viewed from inside of the vehicle) of the door 70 as shown in a driver's seat in FIG. 1. Therefore, no interference may take place with legs of the occupant entering or leaving the vehicle. When this ring plate 96 moves rearward in the vehicle and stops at a position adjacent the lap anchor 104, the webbing fastening operation for the occupant is not hindered by the outer webbing 10 when the occupant closes the door upon being seated.

Figure 12:
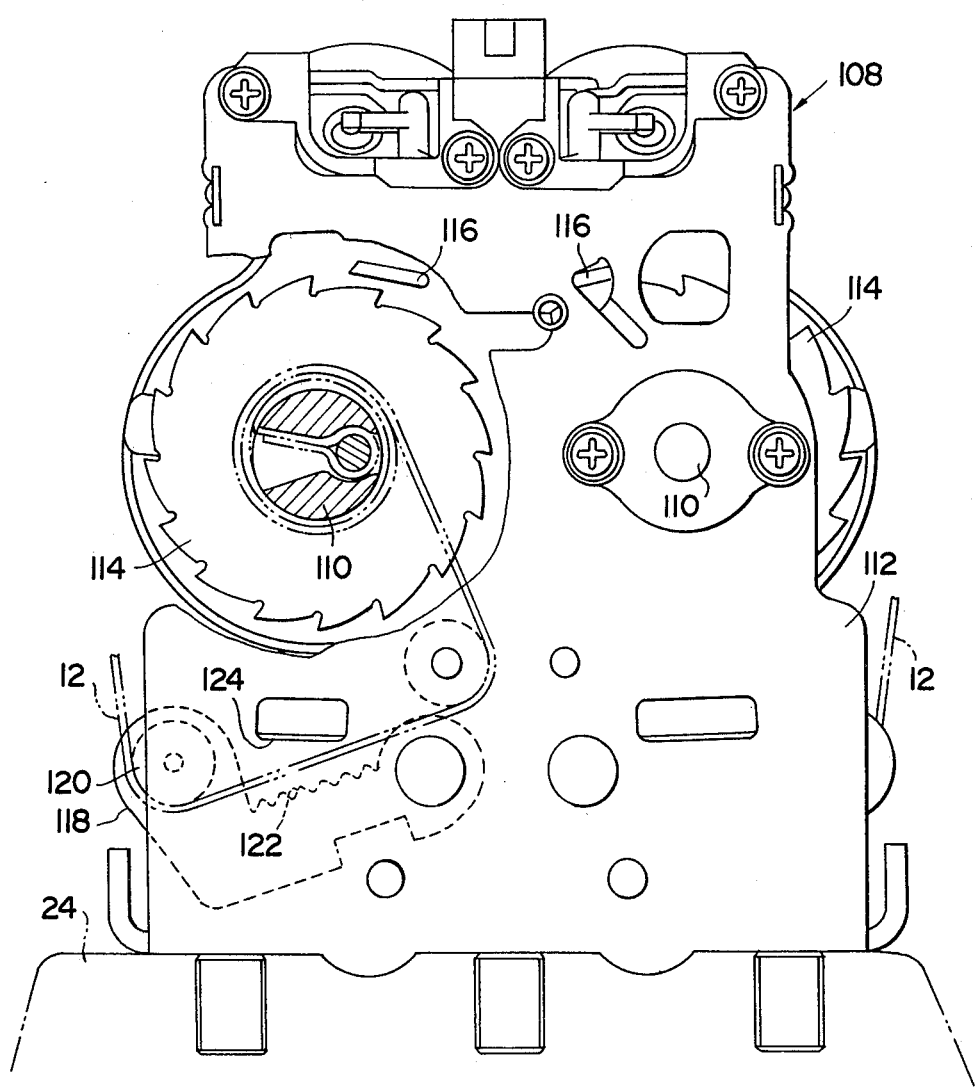
FIG. 12 is a front view showing the retractor.

As shown in FIG. 1, a through-ring 106 is provided at a portion of the outer webbing 10 between the ring plate 96 and the shoulder anchor 14, and movable in the longitudinal direction of the outer webbing 10. The forward end portion of the inner webbing 12 is engaged with this through-ring 106, and the base portion of the inner webbing 12 is wound around a takeup shaft 110 (referring to FIG. 12) of a retractor 108 secured to a floor substantially at the center of the vehicle.

Provided between this takeup shaft 110 and a frame 112 is a windup spiral spring, not shown, which is adapted to wind up the inner webbing 12 by a predetermined value of urging force.

Solidly secured to this takeup shaft 110 is a ratchet wheel 114, which is relatively opposed to a pawl 116 journalled on the frame 112. In an emergency of the vehicle, this pawl 116 is actuated by an acceleration sensor such as a pendulum, not shown, to engage with the ratchet wheel 114, so that the webbing windout rotation of the takeup shaft 110 is stopped. This ratchet wheel 114 and the pawl 116 constitute an inertia lock mechanism.

Furthermore, in this retractor 108, a lever 118 is pivotally supported on the frame 112, and the intermediate portion of the inner webbing 12 is wound around a roller 120 of this lever 118. Consequently, when a tensile force of the inner webbing 12 increases in an emergency of the vehicle, this lever 118 rotates with respect to the frame 112, and wave-shaped ridges 122 provided at the intermediate portion of the lever 118 directly clamp the intermediate portion of the inner webbing 12 in cooperation with a block 124 solidly secured to the frame 112, whereby, in an emergency of the vehicle, the intermediate portion of the webbing 12 is quickly locked to prevent the webbing 12 from moving in the longitudinal direction thereof.

Description will now be given of operation of this embodiment with the above-described embodiment.

The driver's seat in FIG. 1 shows the state of the door 70 being opened for allowing the occupant to enter the vehicle, in which the shoulder guide plate 22 is at the forward end portion of the guide rail 26 and the lap guide plate 84 is at the forward end portion of the lap guide rail 78. Consequently, the outer webbing 10 as a whole has been moved forward in the vehicle and the portion of the outer webbing 10 between the through-ring 106 and the lap anchor 104 has been greatly flexed forward in the vehicle by the ring plate 96, so that the occupant can be easily seated at a seat 126.

When the occupant closes the door 70 upon his seating, the motor 58 is actuated by a door switch, etc., not shown, to rotate the sprocket wheel 56 in the clockwise direction in FIG. 8. By this, when the shoulder guide plate 22 moves along the shoulder guide rail 26 rearward in the vehicle to reach a position indicated by solid lines in FIG. 3, the limit switch 46 comes into contact with the shoulder guide plate 22 to interrupt current passage from a vehicle power source to the motor 58.

Due to the movement of the shoulder guide plate 22, the flexible tape 34 is pushed out of the sprocket housing 52 toward the track 60, and moves rearward in the vehicle in the lap guide rail 78 inside the door 70, with the result that the lap guide plate 84 is also moved rearward in the vehicle to reach a position adjacent the lap anchor 104.

Due to the movements of the shoulder guide plate 22 and the lap guide plate 84 as described above, the inner webbing 12 is wound into the retractor 108, whereby the through-ring 106 approaches the retractor 108. Consequently, a portion of the outer webbing 10 between the through-ring 106 and the shoulder guide plate 22 constitutes a shoulder webbing, and a portion of the webbing between the through-ring 106 and the lap anchor 104 constitutes a lap webbing, whereby the seated occupant is automatically brought into a three-point webbing fastened state (referring to another seat next to the driver's seat shown in FIG. 1).

During normal running condition of the vehicle, the retractor 108 does not lock the inner webbing 12, so that the occupant can take a free posture. Whereas, when the vehicle is involved in an emergency such as a collision, the inertia lock mechanism in the retractor 108 operates to abruptly interrupt the windout of the inner webbing 12. Accordingly, the occupant is positively restrained by a three-point webbing fastened state, thereby securing the occupant safely.

In the emergency of the vehicle as described above, in the shoulder guide plate 22 connected with the shoulder anchor 14, since the enlarged head 32 thereof is positively received in the shoulder guide rail 26 and engaged with the pin 47 of the guide rail 26, and the rear end portion of the shoulder guide rail 26 is disposed in a vertical direction, the end portion of the shoulder webbing is safely supported on the vehicle body and will not move forward in the vehicle accidentally.

When the occupant leaves the vehicle and the door 70 is opened, the shoulder guide plate 22 and the lap guide plate 84 are brought back to the state shown by the driver's seat in FIG. 1 in reversing steps of the above-described steps, whereby the webbing fastened state for the occupant is automatically released, thus enabling the occupant to leave the vehicle without any interferences.

In opening or closing the door described above, since the track 60 in which the flexible tape is guided has the stepped portion 60A at the intermediate portion thereof as shown in FIG. 10, a change in interval between the door 70 and the front pillar 42 may be absorbed by deflection of the stepped portion 60A, so that the movement of the flexible tape 34 in the track 60 is not interfered.

FIG. 13 shows a second embodiment of the present invention, in which a flexible wire 128 is provided between the flexible tape 34 and the lap guide plate 84.

As shown in FIG. 14, this wire 128 extends through a round hole 130 formed at one end portion of the flexible tape 34, turns back thereat, and then, is staked together with a ring 132. The other end of this wire 128 is also secured to the lap guide plate 84 in the lap guide rail 78 as shown in FIG. 15. Additionally, this lap guide plate 84 is constantly urged rearward in the vehicle by an urging device 134 with a spiral spring, which is provided at the rear end portion (as viewed in the vehicle)

of the lap guide rail 78. In this urging device 134 with a spiral spring, an inner end of a constant tension spiral spring 140 is solidly secured to a shaft 138 of a spring case 136, and an outer end of this spiral spring 140 is engaged with the lap guide plate 84. This spiral spring 140 gives a substantially uniform urging force to the lap guide plate 84 no matter where the lap guide plate 84 is located in the lap guide rail 78.

Furthermore, in this embodiment, a track 142 extending forward in the vehicle and shorter than that in the preceding embodiment is connected to the sprocket housing 52. This track 142 has bulged-out portions 144 for smoothly moving the flexibe wire 128. One end of a flexible wire cover 146 is connected to an end of this track 142 (a forward end in the vehicle) opposite the sprocket housing 52, and this wire cover 146 passes through the same moving path as of the track 60 in the preceding embodiment and solidly secured to the forward end portion (as viewed in the vehicle) of the lap guide rail 78 so as to guide the wire 128 to the lap guide rail 78. A stepped portion 146A similar to that in preceding embodiment is provided at the intermediate portion of the wire cover 146, whereby, during opening or closing of the door 70, the wire cover 146 and the flexible wire 128 are deflected to absorb the relative movement between the door and the front pillar, while the flexible wire 128 is allowed to smoothly move.

In the second embodiment with the above-described arrangement, during opening of the door, a tensile force in the axial direction is generated by the driving force of the motor 58 in the flexible wire 128, whereby the lap guide plate 84 is moved forward in the vehicle, thereby placing the outer webbing forward in the vehicle. Upon closing the door, the motor is reversely driven, whereby the spiral spring 140 positively moves the guide rail 78 rearward in the vehicle by the driving force thereof, thereby automatically fastening the outer webbing about the occupant. In this embodiment, since the wire 128 having a circular cross section and the wire cover 146 are disposed between the front pillar 42 and the door 70, the advantages are effected in durability against torsions about the longitudinal axis and the resistance during opening or closing of the door as compared with the tape 34 and the track 42 in the preceding embodiment.

Figure 16:
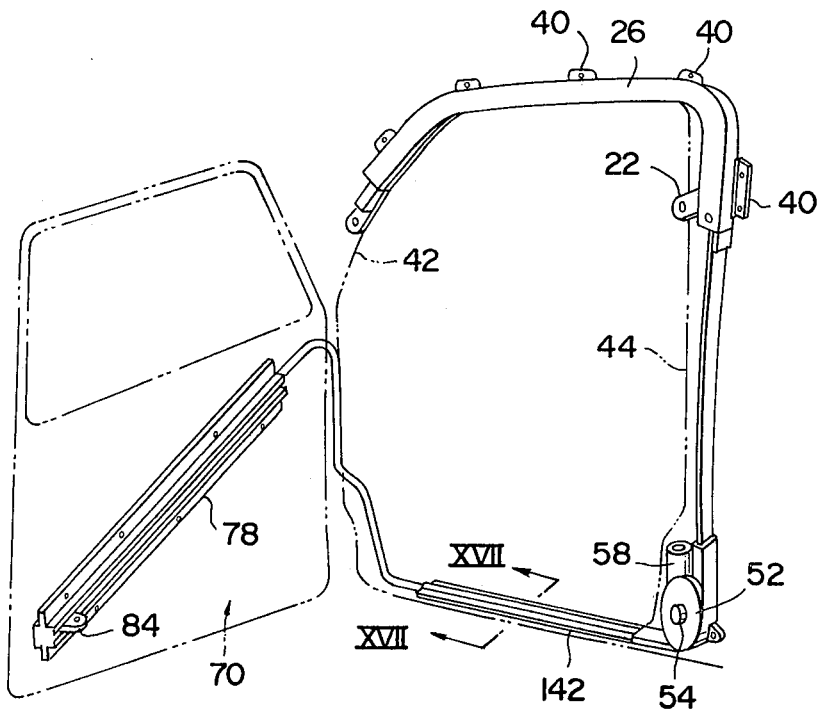
FIG. 16 is a perspective view showing the essential portions of a third embodiment of the present invention.
Figure 17:
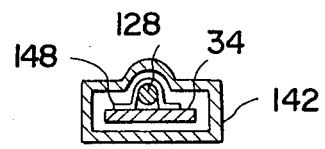
FIG. 17 is a sectional view taken along the line XVII—XVII in FIG. 16.
Figure 18:
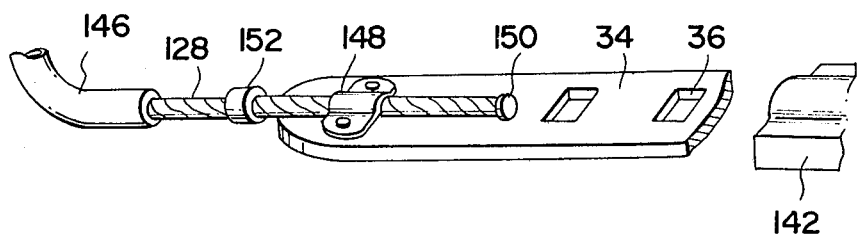
FIG. 18 is a perspective view, partly disassembled, of FIG. 16.

FIGS. 16 through 18 show a third embodiment of the present invention, in which consideration is given to the absorption of a difference in value of the movement when the required movement of the lap webbing differs from the required movement of the shoulder webbing. In FIG. 16, same reference numerals as shown in FIG. 13 are used to designate same or similar parts. As particularly shown in FIGS. 17 and 18, a bracket 148 having a wire passing hole being substantially circular in cross section is solidly secured to an end portion of the flexible tape 34, while, a first stopper 150 is fixed to the forward end of the wire 128 and a second stopper 152 is solidly secured to the intermediate portion of the wire 128 at a position opposite to the first stopper 150 with respect to the bracket 148. Consequently, the wire 128 can relatively move with respect to the flexible tape 34 until either the stopper 150 or 152 comes into contact with the bracket 148.

Other parts of the third embodiment are similar to the aforesaid first embodiment, and in this embodiment, no such spiral spring which urges the flexible wire 128 as in the second embodiment is provided, instead, the rigidity of the flexible wire 128 against compression is designed to be high so that a compressive force in the longitudinal direction can be also transmitted.

Consequently, in this embodiment, when the door is opened, the flexible tape 34 is moved by the motor in a direction of being separated from the sprocket housing, the wire 128 is not moved until the bracket 148 abuts against the first stopper 150, and, after the bracket 148 abuts against the first stopper 150, the wire 128 is pulled by the tape 34 to be moved.

Conversely, when the door is closed, the wire is not moved until the bracket 148 abuts against the second stopper 152, and, after the bracket 148 abuts against the second stopper 152, the wire 128 is subjected to a compressive force in the longitudinal direction and is pushed by the tape 34 because this wire 128 is high in rigidity against compression. As a result, the shoulder webbing can be made smaller in the value of movement than the lap webbing, and when the flexible tape is driven by a single sprocket to move the shoulder webbing and the lap webbing at the same time, the strokes of both webbings can be varied from each other.

As has been described hereinabove, in the automatically fastening seatbelt system according to the present invention, forces for driving the shoulder webbing and the lap webbing are transmitted from opposite end portions of the flexible tape meshed with the sprocket wheel driven by the motor, thereby offering an outstanding advantage that the shoulder webbing and the lap webbing can be moved by a single motor. Particularly, according to the present invention, the shoulder guide rail for moving the shoulder webbing is provided on the vehicle body, so that the present invention is applicable to a motor vehicle with a so-called sashless door having no sash.

What is claimed is:

1. An automatic seatbelt system for automatically fastening shoulder and lap seatbelt webbings about an occupant in a motor vehicle, comprising:
   a shoulder guide rail substantially extending in a longitudinal direction of the vehicle along a roof side portion of a vehicle body;
   a shoulder guide member slidably coupled with said shoulder guide rail and guiding an end portion of the shoulder seatbelt webbing;
   a lap guide rail substantially extending in the longitudinal direction of the vehicle along an inner surface of a vehicle door;
   a lap guide member slidably coupled with said lap guide rail and guiding an end portion of the lap seatbelt webbing;
   a reversibly rotatable sprocket wheel fixed to the vehicle body;
   a flexible tape having a plurality of openings along the longitudinal direction thereof and meshed with said sprocket wheel, said flexible tape extending continuously along the vehicle body at least from said shoulder guide member to said sprocket wheel and connected with said shoulder guide member at one end portion thereof; and
   a flexible wire extending continuously along the vehicle body at least from an end of said flexible tape to said lap guide member and connected with the end of said flexible tape at one end thereof and said lap guide member at the other end thereof; said flexible wire being loosely connected with said flexible tape so that said flexible wire relatively moves with respect to said flexible tape for a predetermined distance.

2. An automatic seatbelt system as set forth in claim 1, further comprising:
- a track slidably storing said flexible tape and extending along the vehicle body at least from a rear end of said shoulder guide rail to said sprocket wheel; and
- a flexible wire cover slidably storing said flexible wire and extending along the vehicle body from an end of said track to a front end of said lap guide rail.

3. An automatic seatbelt system as set forth in claim 1, wherein said flexible wire has a high rigidity so that when said flexible tape pushes said flexible wire in the longitudinal direction thereof, said flexible wire moves accordingly in the longitudinal direction thereof.

4. An automatic seatbelt system as set forth in claim 1, wherein said flexible wire is connected with said flexible tape through a bracket on said flexible tape slidably holding said flexible wire and a pair of stoppers is provided on said flexible wire at both sides of said bracket respectively.

5. An automatic seatbelt system for automatically fastening shoulder and lap seatbelt webbings about an occupant in a motor vehicle, comprising:
- a shoulder guide rail substantially extending in a longitudinal direction of the vehicle along a roof side portion of a vehicle body;
- a shoulder guide member slidably coupled with said shoulder guide rail and guiding an end portion of the shoulder seatbelt webbing;
- a lap guide rail substantially extending in the longitudinal direction of the vehicle along an inner surface of a vehicle door;
- a lap guide member slidably coupled with said lap guide rail and guiding an end portion of the lap seatbelt webbing;
- a reversibly rotatable sprocket wheel fixed to the vehicle body;
- a flexible tape having a plurality of openings along the longitudinal direction thereof and meshed with said sprocket wheel, said flexible tape extending continuously along the vehicle body at least from said shoulder guide member to said sprocket wheel and connected with said shoulder guide member at one end portion thereof;
- a flexible wire extending continuously along the vehicle body at least from an end of said flexible tape to said lap guide member and connected with the end of said flexible tape at one end thereof and said lap guide member at the other end thereof;
- a track slidably storing said flexible tape and extending along the vehicle body at least from a rear end of said shoulder guide rail to said sprocket wheel;
- a flexible wire cover slidably storing said flexible wire and extending along the vehicle body from an end of said track to a front end of said lap guide rail;
- an urging device at a rear end portion of said lap guide rail for constantly urging said lap guide member toward the rear end portion of said lap guide rail;
- said flexible wire and said flexible wire cover extend along the hinge portion of said vehicle door; and
- said flexible wire being loosely connected with said flexible tape so that said flexible wire relatively moves with respect to said flexible tape for a predetermined distance.

6. An automatic seatbelt system for automatically fastening shoulder and lap seatbelt webbings about an occupant in a motor vehicle, comprising:
- a shoulder guide rail substantially extending in a longitudinal direction of the vehicle along a roof side portion of a vehicle body;
- a shoulder guide member slidably coupled with said shoulder guide rail and guiding an end portion of the shoulder seatbelt webbing;
- a lap guide rail substantially extending in the longitudinal direction of the vehicle along an inner surface of a vehicle door;
- a lap guide member slidably coupled with said lap guide rail and guiding an end portion of the lap seatbelt webbing;
- a reversibly rotatable sprocket wheel fixed to the vehicle body;
- a flexible tape having a plurality of openings along the longitudinal direction thereof and meshed with said sprocket wheel, said flexible tape extending continuously along the vehicle body at least from said shoulder guide member to said sprocket wheel and connected with said shoulder guide member at one end portion thereof;
- a flexible wire extending continuously along the vehicle body at least from an end of said flexible tape to said lap guide member and connected with the end of said flexible tape at one end thereof and said lap guide member at the other end thereof;
- an urging device at a rear end portion of said lap guide rail for constantly urging said lap guide member toward the rear end portion of said lap guide rail, an end of said urging device is secured on said lap guide member and another end of said urging device is secured on the rear end portion of said lap guide rail; and
- said flexible wire being loosely connected with said flexible tape so that said flexible wire relatively moves with respect to said flexible tape for a predetermined distance.

* * * * *